March 4, 1969  R. HENLE ET AL  3,430,322
METHOD OF FORMING A BEARING
Filed Feb. 14, 1966  Sheet 1 of 3

Inventors:
RUDOLF HENLE
ROLAND SCHEUFLER
BY Burgess, Dinklage & Sprung
ATTORNEYS

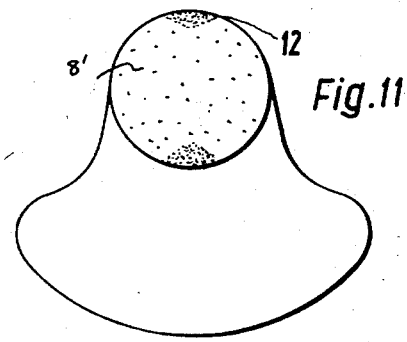
Fig. 11
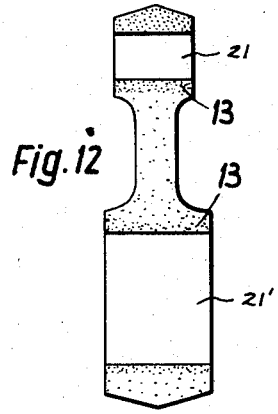
Fig. 12
Fig. 13
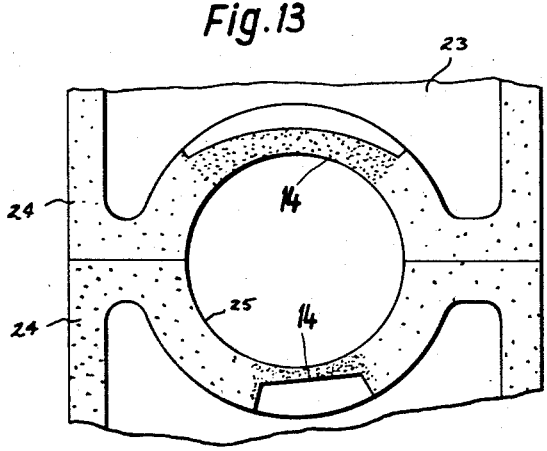
Fig. 14
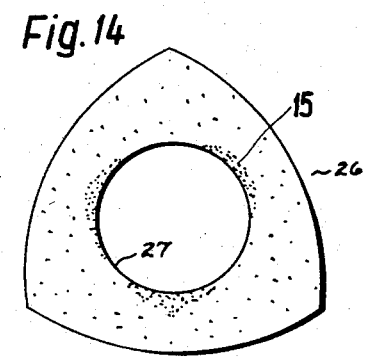
Fig. 15
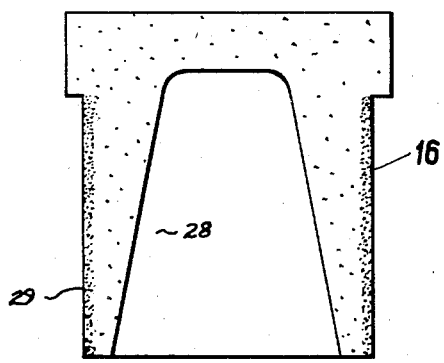
Fig. 16
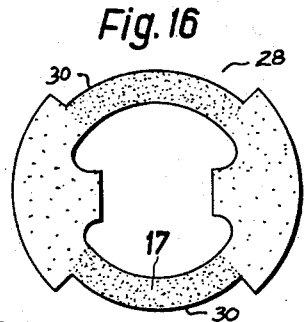
Fig. 17
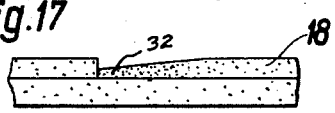
Inventors:
RUDOLF HENLE
ROLAND SCHEUFLER
BY Burgess, Dinklage & Sprung
ATTORNEYS

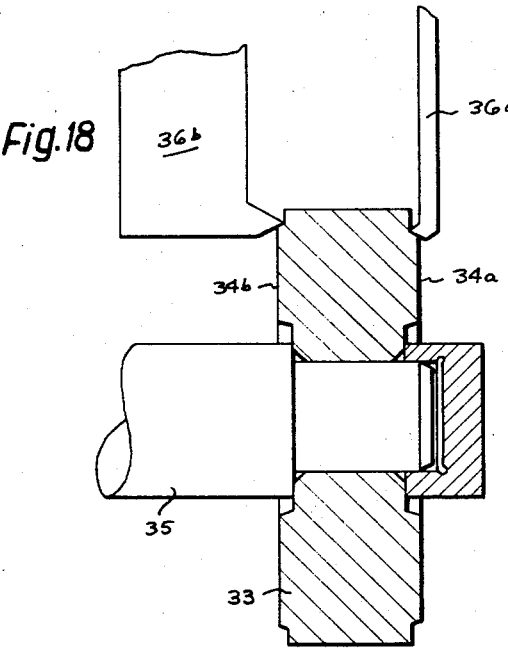
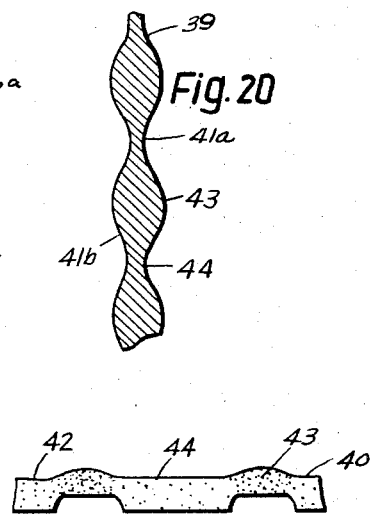
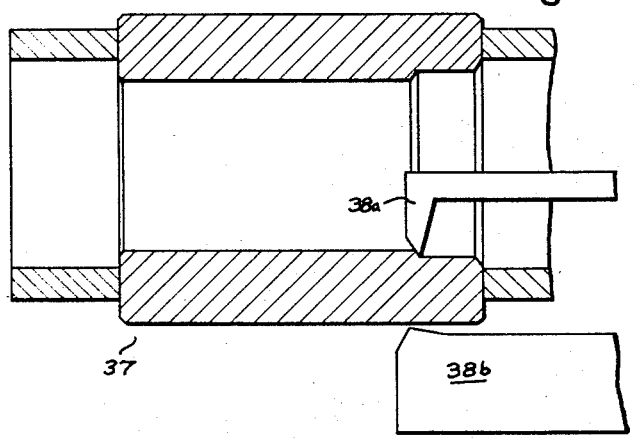

United States Patent Office 3,430,322
Patented Mar. 4, 1969

3,430,322
METHOD OF FORMING A BEARING
Rudolf Henle and Roland Scheufler, Neckarsulm, Germany, assignors to Karl Schmidt G.m.b.H., Neckarsulm, Germany
Filed Feb. 14, 1966, Ser. No. 527,000
Claims priority, application Germany, Feb. 16, 1965, Sch 36,545
U.S. Cl. 29—149.5    5 Claims
Int. Cl. B21d 53/10, 43/28; B23p 13/04

ABSTRACT OF THE DISCLOSURE

Method of forming a bearing comprising taking a bearing blank which has a surface generally disposed to define a sliding contact surface, subjecting such bearing to strain hardening along selected localized regions extending onto said surface and thereafter subjecting the surface to a cutting operation of limited depth to form a finished sliding contact surface having microscopic undulations with a relatively large period to amplitude ratio.

---

This invention relates in general to bearings and more particularly to a lubricated bearing having a microscopically undulating sliding contact surface wherein the trough portions define lubricant gaps and are separated by crest portions defined by strain hardened regions of the bearing which extend into the bearing body from the sliding contact surface thereof.

The depth of the trough portions, or more accurately, the crest-to-trough amplitudes of the contact surface establishes the lubricant gap capacity and in turn, the lubricant film characteristic of the bearing. Preferably, these crest-to-trough amplitudes are within the range of 3 to 13 microns for satisfactory lubricant film formation in most applications.

The invention is directed at providing a satisfactory solution to some of the shortcomings of conventional lubricated journal bearings, and the difficulties encountered in producing such bearings. Particularly in the case of axial thrust bearings, and axial slide bearings, a high degree of machining precision and contour control was required in order to machine the wedge-shaped gaps necessary to assure a proper lubricant film. Resort was made to segmented bearing constructions as the most convenient means of providing bearing surfaces which were contoured to provide the type lubricant gaps needed for high load capacity.

Although in low load journal bearing applications, it is possible to use bearing contact surfaces which exactly match the contour of the journal element, but have a slight clearance therefrom, this is not feasible in high load applications, particularly in the case of axial thrust bearings, which when constructed with exactly plane contact surfaces, are unable to withstand high thrust loads at practical speeds of relative movement.

With segmented bearings of the prior art, the individual segments had to be machined separately rather than in an assembled condition, and consequently all of the segments for each bearing had to be machined with close tolerances on surface contour and angular dimensions in order to assure that they could be fitted together to form a complete bearing. Because this involved considerable difficulty and expense, a trend arose in modern machine design away from journal bearings and toward roller bearings.

Also, in the case of prior art ring bearings, wherein the lubricant wedge formation takes under axial thrust forces, creation of a suitable lubricant film was attempted by providing slots that interrupted the lubricant film flow and rendered the bearing somewhat some elastic. This required a more complex lubricant supply system, and in addition to high cost of production, had a rather limited scope of application because of the larger ring structures required to compensate for strength lost due to slotting, and the fact that in many cases, such slotted ring bearings were suitable for only one direction of journal element movement.

The bearing construction of the instant invention, through the use of a microscopically undulating slide contact surface is not restricted to any one favored direction of journal element motion, nor is it restricted to any particular type of journal bearing. In general, the bearing construction according to the invention can be applied equally as well to axial thrust bearings, radial thrust bearings, end bearings, axial slide bearings, and practically any type of journal bearing which utilizes the hydrodynamic effects of a lubricant film to reduce friction between a bearing surface and a journal element undergoing sliding surface relative movement.

While it may appear to make a bearing having a contact surface with microscopic undulations in the order of 3 to 13 microns in amplitude might require extraordinary precise controlled machine tools, actually the invention provides a relatively simple method for creating such an undulating contact surface.

In the machining of materials, particularly metals by relative movement between a work piece and a cutting tool in contact therewith, the microscopic smoothness of the surface generated by the cutting tool, will for a given over-all rigid setting of the tool with respect to the movement path of the work piece, depend upon the point to point hardness of the work piece material, and for a given cutting depth setting, the thickness of material removed from the work piece will be less at hardened regions thereof than at softer regions.

Rather than to depend upon random hardness variations for creating an undulating contact surface in a bearing by machining, the method of the invention takes a bearing blank which has a surface generally disposed to define a sliding contact surface and subjects such bearing to strain hardening, as by cold working, along selected localized regions extending onto said surface. A minimum of one localized strain hardened region is created, although in general, the number of strain hardened regions will depend upon the number of lubricant gaps to be provided in the finished contact surface, with such strain hardened regions serving to provide crests for separating adjoining lubricant gap or trough regions. After strain hardening, the surface is subjected to a common surface cutting operation of limited depth to generate a finished sliding contact surface having microscopic undulations with a relatively large period to amplitude ratio. A finished sliding contact surface thus created will have microscopic undulations approximately 3 microns in crest-to-trough amplitude. This crest-to-trough amplitude can be increased in general by heating the bearing blank to an elevated temperature for an extended period of time. For example, in the case of aluminum alloy bearing blanks, wherein the starting crest-to-trough amplitude of the contact surface is approximately 3 microns, heating the bearing blank for about 6 hours at 230° C. will result in raising the crest-to-trough amplitude to approximately 10 to 13 microns.

The method for making a bearing having a microscopically undulating contact surface according to the invention is capable of other variations. For example, by heating a bearing blank to a temperature within the range 400° C. to 540° C. for a period ranging from 1 to 12 hours such bearing blank can be annealed to a homogeneous strain condition. This allows a reference surface which is microscopically smooth to be machined on the bearing blank so annealed. Accordingly the bearing blank is then machined to generate a reference surface thereon approximating a selected finished sliding contact surface and selected regions of the bearing blank along the reference surface are cold worked to induce localized strain hardening thereat so that when the bearing blank reference surface is finished machined to the macroscopic dimensions of the finished sliding contact surface microscopic undulations are generated in the finished sliding contact surface. As before, the crest-to-trough amplitudes of these microscopic undulations can be increased by heating the bearing blank to a temperature between 100° C. and 350° C. for 1 to 25 hours to produce a differential aging between the regions of the bearing contact surface corresponding to the strain hardened and nonstrain hardened, i.e., crest and trough regions thereon.

When strating with a bearing blank which has been annealed to have a homogeneous strain hardness distribution, it is not absolutely necessary to make two machining cuts in order to generate a microscopically undulating sliding contact surface. It is possible with such an annealed bearing blank to directly machine a microscopically smooth reference surface thereon having the same macroscopic dimensions of the finished sliding contact surface but which after such machining is microscopically smooth. By strain hardening selected regions along such machined, microscopically smooth surface and then heating the bearing blank to a temperature between 100° C. and 350° C. for a period ranging from 1 to 25 hours, the desired microscopic undulations can be created as a result of differential aging effected by such heat treatment.

In general, the invention is not restricted to any particular bearing blank compositions, but can be applied with equal effectiveness to bearing blanks which are integral bodies of metal, such as steel or aluminum, as well as to bearing blanks having a supporting body of hard metal, such as steel, and a cladding layer of softer metal, such as aluminum, babbitt, etc., adherent thereto and disposed to define the microscopically undulating sliding contact surface. In the case of clad bearing blanks, the cladding layer is strain hardened at selected locations.

It is therefore, an object of the invention to provide a method for forming a journal bearing having suitable lubricant film forming means.

Another object of the invention is to provide a method for forming a bearing as aforesaid having a microscopically undulating sliding contact surface, the troughs of which define lubricant holding gaps to aid in the formation of lubricant films.

A further object of the invention is to provide a method for forming a bearing as aforesaid which is generally applicable to all types of journal bearings, including axial, radial and end thrust bearings, as well as axial slide bearings.

A further object of the invention is to provide a method for a forming bearing as aforesaid which is suitable for high load operation within present day practical machine speed ranges.

Still another and further object of the invention is to provide a method of making the aforesaid journal bearing which is simple economical, and does not require any extraordinary machining precision.

Other and further objects and advantages of the invention will become apparent from the following detailed description and accompanying drawings in which:

FIG. 11 is a cross-sectional view taken transversely through a crankshaft journal which has been provided with strain hardened regions to render its sliding contact surface equivalent to that of a cylindrical bearing constructed in accordance with the invention.

FIG. 12 is a longitudinal section view of a connecting rod, the bores of which have been strain hardened to define journal bearing in accordance with the invention.

FIG. 13 is an end view, partly in section, of a split bearing which has been strain hardened in accordance with the invention.

FIG. 14 is an end view of a rotary piston the bore of which has been strain hardened in accordance with the invention to define a microscopically undulating bearing contact surface.

FIG. 15 is a longitudinal section view of a piston which has been strain hardened in accordance with the invention to define a microscopically undulating peripheral bearing contact surface.

FIG. 16 is a transverse cross-sectional view of the piston of FIG. 15.

FIG. 17 is a longitudinal section through a portion of a composite axial thrust bearing constructed in accordance with the invention.

FIG. 18 is a schematic illustration, partly in section, of a machining arrangement for simultaneously turning and facing two separate bearing contact surfaces of an axial bearing constructed in accordance with the invention.

FIG. 19 is a schematic illustration, partly in section, of a tooling arrangement for simultaneously maching the inside and outside bearing contact surfaces of a radial bearing constructed in accordance with the invention.

FIG. 20 is a sectional view through a portion of a bearing having two oppositely disposed microscopically undulating sliding contact surfaces shown in exaggerated form.

FIG. 21 is a sectional view through a portion of another bearing body having a single microscopically undulating bearing contact surface.

Figure 1:
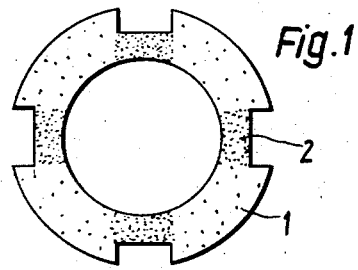
FIG. 1 is an end view of a radial bearing constructed in accordance with a preferred embodiment of the invention.
Figure 2:
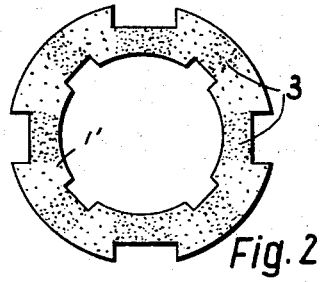
FIG. 2 is an end view of another radial bearing constructed in accordance with the invention.

The numerous modifications and variations of the bearing construction according to the invention are best explained in connection with the figures of the drawing. FIG. 1 shows a lateral view of a radial bearing 1 having four strain hardened zones 2 created by cold working the bearing body 1 at corresponding portions of its periphery. In FIG. 2 is shown a cross section through a radial bearing 1' having eight strain hardened zones 3 distributed in a uniform angular spacing with respect to the inner and outer peripheries of the bearing body 1'.

Figures 3, 4:
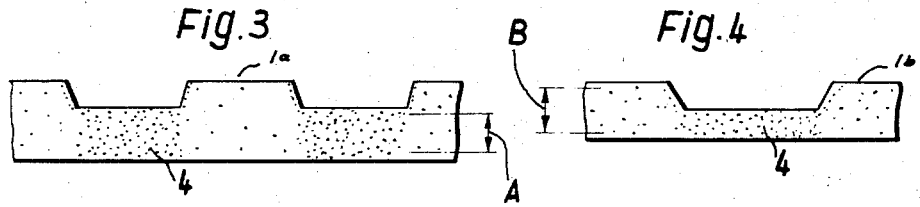
FIG. 3 is a longitudinal cross-sectional view of a portion of an axial slide bearing constructed in accordance with the invention.
FIG. 4 is a longitudinal cross-sectional view of a portion of another axial slide bearing constructed in accordance with the invention.

FIGS. 3 and 4 show sections of axial bearings 1a and 1b having respectively two and one strain hardening zones 4. The dimensions A and B in FIGS. 3 and 4 respectively indicate typical depths, proportionally to which the bearing bodies 1a and 1b are finish machined in producing their ultimate sliding contact surfaces with microscopic undulations.

Figure 5:
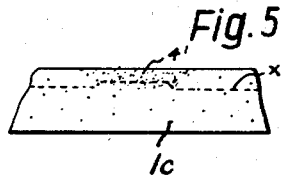
FIG. 5 is a longitudinal cross-sectional view of another portion of an axial slide bearing constructed in accordance with the invention.

FIG. 5 shows a portion of an axial bearing 1c having a single strain hardening region 4' which when finish machined will produce a sliding contact surface having an exaggerated microscopic undulations represented by the phantom surface X.

Figure 6:
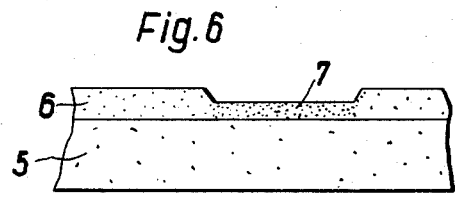
FIG. 6 is a longitudinal cross-sectional view of a portion of a composite axial slide bearing constructed in accordance with the invention.

As illustrated by FIG. 6, the invention is equally applicable to composite bearing constructions as for example, one having a steel bearing blank supporting body 5 and an aluminum cladding layer 6 bonded thereto. The sliding contact surface is machined into the aluminum layer 6, which accordingly is strain hardened as by compression cold working at typical regions 7, so that upon finish machining, a microscopically undulating surface results.

Figure 7:
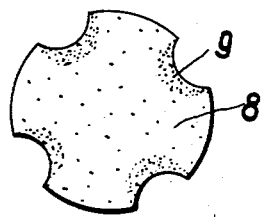
FIG. 7 is a transverse cross-sectional view of another journal bearing constructed in accordance with the invention.

While in general, the bearing is frequently stationary with respect to its associated machine frame or housing, and the journal element moves, as for example rotates, relative thereto, the bearing surfaces according to the invention can also be produced on journal elements in a similar manner. For example, FIG. 7 shows the cross section through a journal member 8 having four strain hardening zones 9 arranged in a substantially uniform angular pattern about the periphery of journal 8.

Figure 8:
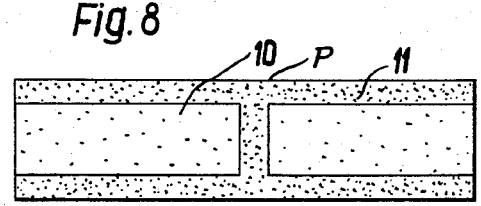
FIG. 8 is a plan view of the bar portion of a double-oval slide bearing constructed in accordance with the invention.

FIG. 8, which shows a plate bar 10 of a double-oval slide bearing, exemplifies a different arrangement of strain hardening regions 11 obtained by compression. When the plate bar 10 is finish machined the hardened regions 11 will become crests which separate and bound the regions P, which will become troughs for holding lubricant.

Figure 9:
FIG. 9 is a development view of a portion of a radial bearing constructed in accordance with the invention illustrating a typical arrangement of strain hardened regions thereon.
Figure 10:
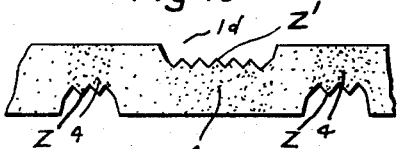
FIG. 10 is a development view of a portion of another radial bearing constructed in accordance with the invention and illustrating a strain hardened region arrangement somewhat similar to that of FIG. 9.

FIGS. 9 and 10 exemplify a radial bearing 1d each having three typical strain hardened regions 4 located at corresponding indented portions Z and Z'. This illustrates that the surfaces associated with the portions Z and Z', which can be considered as macroscopically undulating, can also be treated in accordance with the invention. Therefore, the particular macroscopic shape of the bearing sliding contact surface is immaterial insofar as the practice of the invention is concerned.

FIG. 11 illustrates a crankshaft journal 8' which has been strain hardened at each of two peripheral zones 12. When the journal 8' is finish machined, as by turning on a lathe (not shown), the nonhardened portions of its periphery between zones 12 will experience a greater depth of material removal than will the hardened portions defined by zones 12 for a given rigid setting the cutter tool (not shown), and a macroscopically undulating sliding contact surface, in this case cylindrical, will be generated wherein the peripheral zones 12 will be crests and the remaining nonhardened zones will be troughs defining lubricants gaps or pockets.

In FIG. 12, each of the two bores 21 and 21' of the connecting rod 22 have been strain hardened at two peripheral regions 13 to provide upon finished boring thereof, microscopically undulating bearing surfaces similar to those provided on the journal 8' in FIG. 11, but inversely disposed since these bearing surfaces are defined by cylindrical bores 21 and 21'.

It is not necessary that the bearing blank be an integral body in order to use the method of the invention, but as illustrated by FIG. 13 a split bearing body 23 having two halve segments 24 can be strain hardened at peripheral zones 14 and then finish machined over the bore 25 to produce a microscopically undulating bearing bore surface 25 wherein the hardened peripheral zones 14 are crests and the remaining nonhardened peripheral zones are lubricant troughs.

Similarly, FIG. 14 illustrates a rotary piston 26 of the type used in rotary piston machines (not shown) having a bore 27 which has been strain hardened at three peripheral zones 15.

FIGS. 15 and 16 illustrate a piston 28 of the type used in lifting piston machines (not shown) that has been strain hardened at two surface regions 16 on its peripheral surface 29, ordinarily cylindrical, in order to render said surface 29, after finish machining, suitable for use as a bearing slide surface. As can be seen from FIG. 16, additional regions 17 can also be hardened to render their associated surfaces 30 suitable as bearing slide contact surfaces.

In FIG. 17 is shown a cutaway portion of a composite axial bearing 31 having a cladding layer 18, somewhat slanted and strain hardened at the region 32.

After strain hardening, the bearing blanks can be finish machined simultaneously along one or more treated surfaces, as illustrated by FIGS. 18 and 19. For example, an axial bearing blank 33 which has been treated by strain hardening various regions along its end faces 34a and 34b can be mounted on a lathe arbor 35 and faced by simultaneous operating cutters 36a and 36b as shown in FIG. 18. Similarly, a cylindrical shaped radial bearing 37 can be simultaneously finish bored internally and turned along its outer periphery by cutters 38a and 38b respectively.

FIGS. 20 and 21 represent cutaway portions of bearing bodies 39 and 40 respectively, which have been produced in accordance with the invention. The bearing body 39 has two oppositely disposed finished, microscopically undulating sliding contact surfaces 41a and 41b (shown with greatly exaggerated undulations), whereas the bearing body 40 has one such contact surface 42 (also shown with great exaggerated undulations).

On surfaces 41a, 41b and 42, the crest portions 43 correspond to regions which had been strain hardened prior to finish machining, whereas the trough portions 44 which define the lubricant gaps, correspond to regions which had not been strain hardened prior to machining.

As can be appreciated by the artisan, the invention provides a method of bearing construction which is applicable universally to journal bearings and is based upon the discovery that by strain hardening selected regions of a bearing blank before it is finish machined, the bearing, or sliding contact surface generated by such finish machining will assume a varying or undulating depth profile of microscopic amplitude, i.e., about 3 microns over crest regions corresponding to previously hardened zones and trough regions corresponding to zones which were not subjected to strain hardening. It should be noted that the undulating depth profile in the bearing surface is created not by controlling the feed of the cutting tools, which would be practically impossible with currently available latches, milling machines, and shapers, the best of which can only be controlled to make a minimum cut depth of about 0.0001 inch, but rather by locking the cutting tools to make a finish cut down to the macroscopic dimensions of the intended bearing surface. The varying resistance to cutting presented by the portions of the bearing blank having different hardnesses will automatically effect a microscopic variation in the actual cutting depth to produce a microscopically undulating bearing surface. Hence, the invention provides a simple method to vary the profile of a bearing surface over a range of a few microns, without the need for any extraordinary precision control over the cutting tools.

For example, in the case of the rotary piston 26 of FIG. 14, where it is desired to machine the bore 27 thereof to define a cylindrical bearing surface 2.0000±0.0005 inches in diameter, the bore 27 can be turned to a diameter of 1.99990 inches to provide a cylindrical reference surface approximating the intended final bearing surface, and then strain hardened at each of the regions 15. After strain hardening, a finishing cut of 0.0005 to 0.0009 inch can be made on the bore 27 to bring it up to the final dimension tolerance. Microscopically, the nonhardened portions of the bore 27 will have a greater radial depth than those corresponding to the hardened zones 15, by about 3 microns. The radial depth between the crest portions 27 which will be a microscopically undulating cylindrical surface, can be further increased to about 10–

13 microns by heating the piston 26 to a temperature of about 230° C. for about 6 hours.

Alternatively, the piston 26 can be annealed by heating it for 1 to 12 hours at a temperature between 420° C. and 540° C. so that the regions underlying the bore 27, which is preferably first rough machined to about 1.9990 inches diameter, will assume a homogeneous hardness distribution. After annealing, the bore 27 is machined to the final macroscopic dimension of 1.9995 to 1.9999 inches diameter as before. The bore 27 surface thus produced will be substantially microscopically uniform, and can be rendered microscopically undulating simply by heating the piston 26 to a temperature between 100° C. and 350° C. for 1 to 25 hours. This will produce a differential aging of the hardened zones 15 and non-hardened zones thereby transforming the microscopically uniform bearing bore 27 into a microscopically undulating bearing bore 27, achieving substantially the same result as before.

We claim:

1. A method for making a bearing which comprises subjecting a bearing blank having a surface generally disposed to define a sliding contact surface to strain hardening by cold working at a minimum of one localized region thereof, and thereafter subjecting said surface to a common surface cutting operation of limited depth to generate a finished sliding contact surface having microscopic undulations, the crest regions of which correspond to strain hardened regions, and the troughs of which correspond to nonstrain hardened regions and define lubricant gaps.

2. The method according to claim 1 wherein following said surface cutting operation, said bearing blank is heated to an elevated temperature within the range of 100–350° C. for from 1 to 25 hours to effect differential aging of the trough and crest regions to increase their crest-to-trough amplitudes and thereby increase the lubricant capacity of the gaps defined by said troughs.

3. The method according to claim 2 wherein said bearing block is heated at approximately 230° C. for about 6 hours.

4. A method for making a bearing having a microscopically undulating sliding contact surface, the trough portions of which define lubricant gaps, which comprises heating a bearing blank to a temperature within the range of 420° C. to 540° C. for a period ranging from 1 to 12 hours to anneal same to a homogeneous strain condition, machining said bearing blank to generate a reference surface thereon approximating a selected finished sliding contact surface, cold working selected regions of the bearing block along said reference surface to induce localized strain hardening thereat, said strain hardened regions corresponding to selected crest portions of the finished, microscopically undulating sliding contact surface, and the remaining nonstrain hardened regions along said reference surface corresponding to the trough portions and hence the lubricant gaps of the finished sliding contact surface, machining said reference surface to macroscopic dimensions of the finished sliding contact surface and thereby generating a finished sliding contact surface having microscopic undulations, the crests of which correspond to said strain hardened regions and the troughs of which correspond to the nonstrain hardened regions and define lubricant gaps.

5. The method according to claim 4 including the step of heating said bearing blank after finish machining to a temperature between 100° C. and 350° C. for a period ranging from 1 to 25 hours to effect differential aging of the trough and crest regions to increase their crest-to-trough amplitudes and hence the lubricant capacity of the gaps defined by said troughs.

References Cited

UNITED STATES PATENTS

| 1,815,626 | 7/1931 | Lee et al. | 72—324 |
|---|---|---|---|
| 1,964,671 | 6/1934 | Nesbitt | 308—241 |
| 2,373,871 | 4/1945 | Connor et al. | 29—149.5 |
| 2,674,782 | 4/1954 | Surtees. | |
| 3,110,085 | 11/1963 | Sternlicht. | |
| 3,195,221 | 6/1965 | Martin et al. | |
| 3,319,314 | 5/1967 | Caubet | 29—149.5 |

THOMAS H. EAGER, *Primary Examiner.*

U.S. Cl. X.R.

29—558; 72—324, 341